(12) United States Patent
Do et al.

(10) Patent No.: US 7,283,093 B2
(45) Date of Patent: Oct. 16, 2007

(54) METHOD AND SYSTEM FOR MONITORING LOCATION BASED SERVICE EMITTER INFRASTRUCTURE

(75) Inventors: Phuc K. Do, Morrisville, NC (US); Justin M. Pierce, Cary, NC (US); Richard S. Shryock, Cary, NC (US); Charles R. Kirk, Raleigh, NC (US); Eugene M. Maximilien, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 234 days.

(21) Appl. No.: 10/975,143

(22) Filed: Oct. 27, 2004

(65) Prior Publication Data

US 2006/0087474 A1    Apr. 27, 2006

(51) Int. Cl.
*G01S 1/08* (2006.01)
*G01S 3/02* (2006.01)

(52) U.S. Cl. ...................... 342/386; 342/463
(58) Field of Classification Search ............... 342/32, 342/37, 53, 386, 464, 463; 455/526; 340/568.5; 701/208, 209
See application file for complete search history.

(56) References Cited

U.S. PATENT DOCUMENTS

| | | | |
|---|---|---|---|
| 4,875,158 A | 10/1989 | Ashkin et al. | 364/200 |
| 5,291,411 A * | 3/1994 | Bianco | 701/207 |
| 5,406,271 A * | 4/1995 | Sonnendorfer et al. | 340/5.91 |
| 5,742,238 A | 4/1998 | Fox | 340/825.49 |
| 6,323,753 B2 | 11/2001 | Begum | 340/5.91 |
| 6,339,709 B1 | 1/2002 | Gladwin et al. | 455/456 |
| 6,420,971 B1 | 7/2002 | Leck et al. | 340/542 |
| 6,529,164 B1 * | 3/2003 | Carter | 342/463 |
| 7,183,910 B2 * | 2/2007 | Alvarez et al. | 340/539.13 |
| 2003/0146835 A1 | 8/2003 | Carter | 340/539.13 |
| 2003/0148775 A1 | 8/2003 | Spriesterbach et al. | 455/456 |
| 2004/0006593 A1 | 1/2004 | Vogler et al. | 709/203 |

FOREIGN PATENT DOCUMENTS

EP    0928126    7/1999

OTHER PUBLICATIONS

IBM Technical Disclosure Bulletin, *Self-Directed Hardware Maintenance Using Head-Up Displays*, vol. 37, No. 8, Aug. 1994, p. 567.
IBM Technical Disclosure Bulletin, *Mobile Visualization of Remote Sensor Data*, vol. 37, No. 8, Aug. 1994, pp. 489-490.

* cited by examiner

*Primary Examiner*—Thomas H. Tarcza
*Assistant Examiner*—Nga X. Nguyen
(74) *Attorney, Agent, or Firm*—Sawyer Law Group LLP

(57) ABSTRACT

A system and method for monitoring location based service emitter infrastructure. Beacon data is stored, the beacon data transmitted by beacons in an area and detected by a client device that is moved along a path at the location. The beacon data along the path of the client device is analyzed to determine whether any of the detected beacons have failed.

33 Claims, 5 Drawing Sheets

METHOD AND SYSTEM FOR MONITORING LOCATION BASED SERVICE EMITTER INFRASTRUCTURE

FIELD OF THE INVENTION

The present invention relates to location based services implemented with electronic devices, and more particularly to the monitoring of a location based service emitter infrastructure.

BACKGROUND OF THE INVENTION

Location Based Services (LBSs) include electronic systems that provide the capability to find the location of a mobile electronic device and provide services based on this location information. For example, some LBS systems can deliver a geographical location of a mobile user or object, or other objects, to other users or computers via an electronic communication link, such as the Internet and/or a wireless network.

LBS systems can also be used in more confined areas, such as a retail store. A typical problem for a customer shopping in a retail store is locating the items that are of interest to the customer. For example, customers in a store must locate items, then take the items to the checkout area for purchase. Difficulties in locating items are compounded by unfamiliar stores, by changes in the store layout, etc. A LBS system can be used by customers to locate themselves within the store and used by store managers for security, inventory or for tracking customer purchase.

One type of LBS system that can be used within a retail store is an infrared LBS system. Infrared emitters or "beacons" can be placed in several locations within the store and each can emit a different identification, i.e., identification data, which indicates a unique identification for that particular emitter. While shopping in the store, a customer can bring along and access a moveable or portable client device, such as a personal digital assistant, cellular phone, a device residing on a shopping cart or basket, or other device, which can receive the emitted infrared identification information from the emitter via an IR port. The location identification data can be processed at the client device, or at a central server that is in communication with the client device, e.g., wirelessly, to access a database of store location information and use the detected emitter identification to find the location of that emitter in the store. This indicates the client device's location in the store, which can then be provided to the customer or user. For example, the user's current location on a map of the store layout can be displayed on a display screen of the client device or a connected display screen, allowing the user to quickly locate himself or herself within the store. Furthermore, suggested paths to desired products can be indicated on the display, those paths starting from the user's determined current location. Other usages include providing offers and information for proximate products, tracking customer shopping patterns, etc. As the customer and client device move close to other infrared emitters, those emitters' signals are received by the client device over the infrared communication link, and the client device and/or server can use that information to update the client device's location within the store.

A problem with infrared emitters and other types of emitters in such an LBS system is that the emitters often receive power from batteries. If the power in the batteries becomes drained, the emitters eventually fail. In addition, emitters may fail for other reasons, such as an emitter diode failing or another component malfunctioning. Failure of emitters is not automatically known to the system manager; the only way to know if an emitter has failed is to individually inspect each emitter device, including battery level, etc. This is time consuming and tedious, especially when many emitter devices are provided in an area such as a retail store.

Accordingly, what is needed is an apparatus and method for easily monitoring the state of a location based service infrastructure that includes emitters or beacons. The present invention addresses such a need.

SUMMARY OF THE INVENTION

The invention of the present application relates to a system and method for monitoring location based service emitter infrastructure. In one aspect of the invention, a method for monitoring the infrastructure of a location based service includes storing beacon data transmitted by a plurality of beacons in an area and detected by a client device that is moved along a path at the location, and analyzing the beacon data along the path of the client device to determine whether any of the detected beacons have failed. Similar aspects of the invention provide a computer readable medium for implementing similar features.

In another aspect, a system for monitoring the infrastructure of a location based service includes at least one client device that is moveable along at least one path in an area and which can detect beacon data transmitted from each of a plurality of beacons provided in the area, and a server that receives the beacon data from the at least one client device. The server includes a storage device that stores the beacon data, where the server analyzes the beacon data along the path of the client device to determine whether any of the detected beacons have failed.

The present invention allows the failures of emitters in a location based service infrastructure to be easily monitored and detected. An area manager does not need to individually test each emitter to determine whether it is working properly, since the system determines the needed information. Furthermore, the system can detect emitter failures, or intermittent failures, using the normal operation and components of the location based service infrastructure without needing any additional hardware or extensive new procedures.

DETAILED DESCRIPTION

The present invention relates to location based services implemented with electronic devices, and more particularly to the monitoring of a location based service emitter infrastructure. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the client devices and server architectures usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1 through 5 in conjunction with the discussion below.

Figure 1:
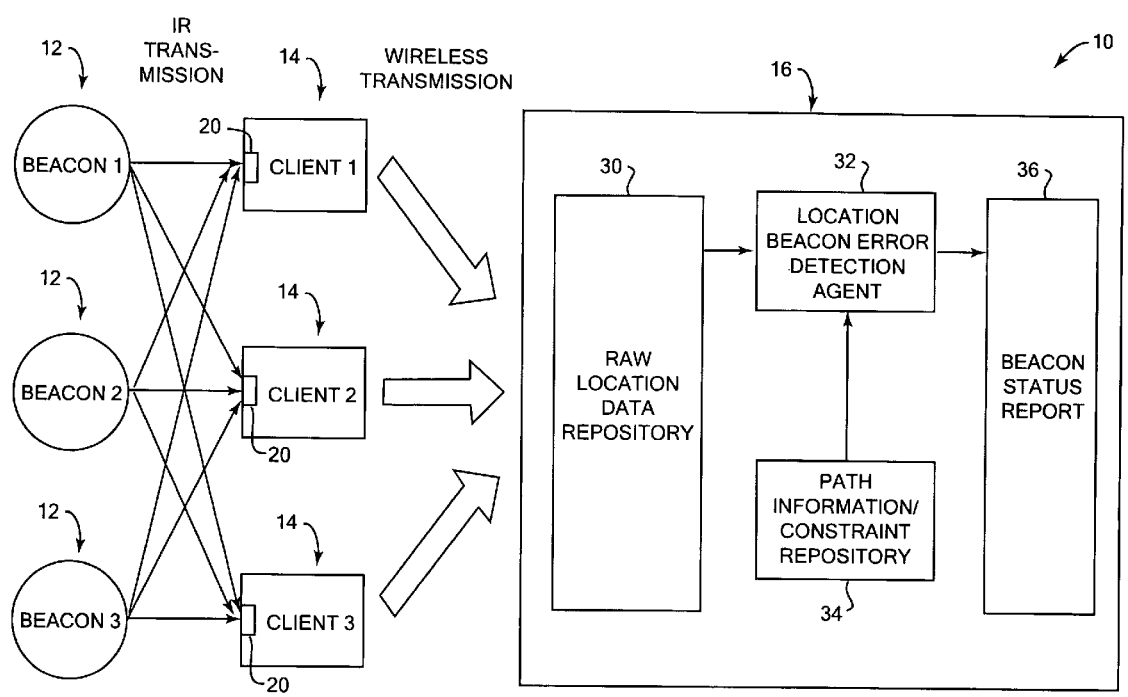
FIG. 1 is a block diagram illustrating a location based service system suitable for use with the present invention.

FIG. 1 is a block diagram illustrating a location based service system 10 suitable for use with the present invention. System 10 can be provided in any desirable area that provides location tracking or other location-based information to users in the area. System 10 includes a number of infrared (IR) beacons 12, a number of client devices 14, and a server 16.

IR beacons 12 are emitters that each emit an infrared beam into a particular zone or area around the beacon, that beam providing information that can be received by an appropriate IR receiver. For example, each IR beacon 12 can transmit an identification code which identifies that particular beacon to a receiving client device 14 and/or server 16. In some embodiments, the IR beacons 12 can also transmit other information, such as data indicating the battery life, diode life, or other status of the beacon.

Client devices 14 are provided to users, such as customers within a retail store, and are generally moveable or portable devices that allow users some freedom of movement within the area. Typically, each user or group of users is provided with a client device 14. Each client device 14 includes an infrared receiver 20 that is able to receive the infrared signals emitted from the beacons 12 and extract the information from those signals. In addition, in some embodiments, each client device 14 can emit signals to relay beacon information to a server or other device. In the described embodiment, a client device 14 includes a wireless transmitter and can output wireless signals such as radio frequency (RF) signals to a server device 16 within range of the output signals. In some embodiments, the client devices 14 can also include wireless receivers which can receive wireless signals from the server 16.

Client devices 14 can take many forms in different embodiments. Typically, a client device is an electronic device having an input interface for the user to input data and an output interface to provide data to the user. In one embodiment for a retail store area, each client device 14 is a small electronic device coupled to a wheeled shopping cart or carried basket which the user moves around the store to hold items the user has selected for purchase or checkout. The electronic device can include a display screen for displaying a map or layout of the store to the user to aid in finding items of interest, and the client device's current location can be displayed on the map or layout to help the user in locating himself or herself within the store. In other embodiments, the client devices 14 can take other portable forms to be carried by the user. For example, the device can be a portable computer or portable device/article that includes a computer, such as a laptop computer, personal digital assistant (PDA), cell phone, tablet computer, portable organizer, electronic wristwatch, etc. Each client device 14 can include one or more processors (microprocessors, application specific integrated circuits, etc.), memory (RAM and/or ROM), and input/output (I/O) components (network interface, input devices, output devices), as is well known.

Each client device 14 can include an additional variety of location based functions of interest to a user besides locating the user within the monitored area. For example, a user may be able to input a shopping list of desired items, or query for particular items in the store, or request an efficient route to a desired item. Any type of input device can be used for such input, including buttons, stylus, pointer, touchscreen, microphone, etc. In some embodiments, shoppers can utilize a Smart Card or other storage card or device, which stores master list data which the client device can access. A client device 14 can output information to a user using any of a variety of output devices, such as display screen, printer, audio speakers, and tactile feedback, etc.

In other embodiments, the beacons 12 can emit other types of signals which are detected by client devices 14. For example, radio signals, such as radio frequency identification (RFID) signals, can be used, where the beacons include tags to be read by readers on the client devices.

Server 16 can be included in system 10 to manage the operations of the system and provide a central database for use with client devices 14. The server 16 can have a communication link with each client device 14, e.g., a wireless receiver for receiving signals such as RF signals, or other convenient link. In some embodiments, the server 16 can include a wireless transmitter for sending wireless signals to receivers in the client devices 14. Server 16 can be a computer, such as a mainframe, desktop, or other computer device, that includes the necessary components for processing and storing information, such as one or more microprocessors, hard drives and/or other storage devices, etc. The server preferably runs a number of programs and agents that manage location based service functions.

The server 16 can process the information from the beacons 12 which is passed to the server from the client device 14. In some embodiments, the server 16 receives all information from the beacons, and the client device 14 performs no processing on the beacon data except to send it to the server. The server can then reference stored data to determine the client device's location in the serviced area. In some embodiments, the server can send data back to the client device 14 so that the client device 14 can provide relevant information to the user, such as displaying map or layout information and the user's current position on that map. In addition, the server 16 can determine whether a client device and customer have strayed from a user-selected route and can recalculate the desired route and/or redirect the customer to the original route. In other embodiments, the client device 14 can have location information stored locally to the device 14, and can process the beacon data itself to determine the position of the client device 14 with respect to the entire area.

The server 16 also preferably stores the raw beacon data from the client device 14, this data assisting in the monitoring of the location based service emitter infrastructure of the present invention. The server can receive raw beacon data indicating the identification of the beacons 12 that were detected by each client device 14 and the time of reception of each beacon identification is logged by the server. Alternatively, each client device can log the time it receives a beacon's signal and send the timestamp information to the server along with the beacon signal detected (raw beacon data). In the described embodiment, the server 16 can store the raw beacon information (and any other needed information, such as timestamps) in a raw location data repository 30.

At some predetermined time or periodic interval, a location beacon error detection agent program 32 can examine the raw beacon data in the repository 30, looking for errors in beacon data that may indicate a failure of one or more beacons 12. To perform this examination, the agent 32 receives path and constraint information from a repository 34 in the server 16, which indicates the paths that client devices 14 can take through the monitored area and the constraints for all possible paths. The examination of beacon data is described in greater detail below with respect to FIGS. 3 and 5.

Once the raw beacon data is examined, a beacon status report 36 is generated and stored on the server. This status report can be examined by system operators or programs to determine whether any errors have occurred in beacons 12. Thus, no time-consuming process of checking each individual beacon for failure need be performed by the system operator.

Figure 2:
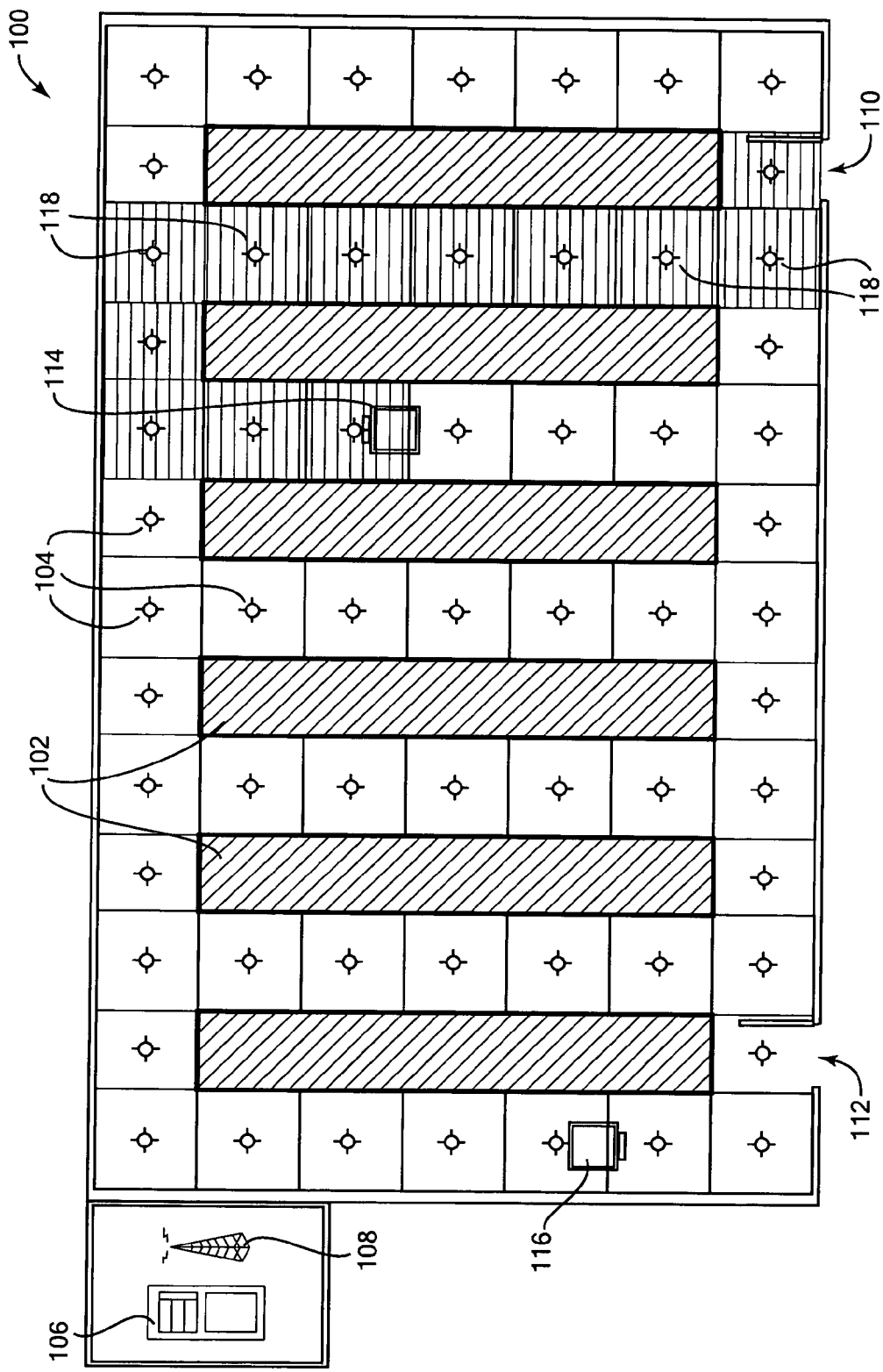
FIG. 2 is a diagrammatic illustration of an example of a retail store area implementing a location based service in accordance with the present invention.

FIG. 2 is a diagrammatic illustration of an example 100 of a retail store area implementing a location based service system in accordance with the present invention. In this example, the location based service is used to track the motion of the client device and customer throughout the retail store, which can be used in some embodiments to assist the customer in locating themselves and items of interest in the store, and can also be used by the store managers/operators for security or other applications. In accordance with the present invention, the location based service can also be used by the store owner or manager to monitor the functionality and operability of the emitter infrastructure.

Retail store 100 includes an area having a number of shelves 102 in which items are stored and displayed to customers for purchase. For example, a supermarket typically has food and related items provided on shelves similar to shelves 102 which customers can place in a shopping cart. A number of IR beacons 104 are provided throughout the store, which, for example, can be placed in any convenient location, such as overhead in a ceiling or other fixture, in the floor of the store, in the shelves 102, etc. In the described embodiment, the beacons 104 are placed at regular intervals, but need not be placed that way in other embodiments. In addition, a server 106 is provided at a location in, near, or associated with the store 100. The server 106 is positioned so that a wireless receiver 108, connected to the server, can receive wireless signals from client devices 14 used in the store 100. For example, server 106 can be positioned in a side room or other area of the store. In some embodiments, receiver 108 can also include a transmitter, and the carts 114 and 116 can also include compatible wireless receivers so that the server 106 may communicate signals to the carts.

A customer enters the store at an entrance 110 or 112 with a shopping cart 114 or 116, respectively. In the described embodiment, each of shopping carts 114 and 116 has a client device 14 coupled to or integrated within the cart, and each client device includes an IR detector 20 (in other embodiments, a customer may have a portable client device not attached to a cart). In some embodiments, robotic shopping carts can be provided, which include motorized or mechanical components to drive themselves along routes established by server 106.

As cart 114 is moved throughout the store with a customer, the path of the cart is detected by the client device by detecting the IR emitted signals of the beacons 104 in that path. For example, the path of cart 114 in store 100 is indicated by the horizontally shaded path beacons 118 in FIG. 2. The detected beacon signals are transmitted by the client device on cart 114 by a transmitter to the server 106 via wireless signals that are received by the wireless receiver 108 of the server 106. For example, the detected unique beacon identification codes can be transmitted to the server 106 in real time for each encountered beacon, and the server 106 can log the time and duration of detection (and/or the client device 14 can transmit time/duration information to the server. The client device 14 of cart 116 similarly detects the signals from beacons 104 in the path of cart 116 and transmits those beacon IDs to the server 106.

The server 106 can process the detected beacon signals to determine whether any of the encountered beacons 118 have failed. This is described in greater detail with respect to FIGS. 3 and 5.

Some embodiments of the invention can also allow the client device 14 to receive information from the server 106. For example, a personal client device can be sent a current store layout, or a current store inventory for display to the customer. A client device can also receive (or generate locally) an optimized route through the store to obtain items of customer interest. In some embodiments, multiple different efficient routes can be determined and presented to the user based on items the user has designated are of interest, thereby allowing the user to select a desired route from the presented routes.

Figure 3:
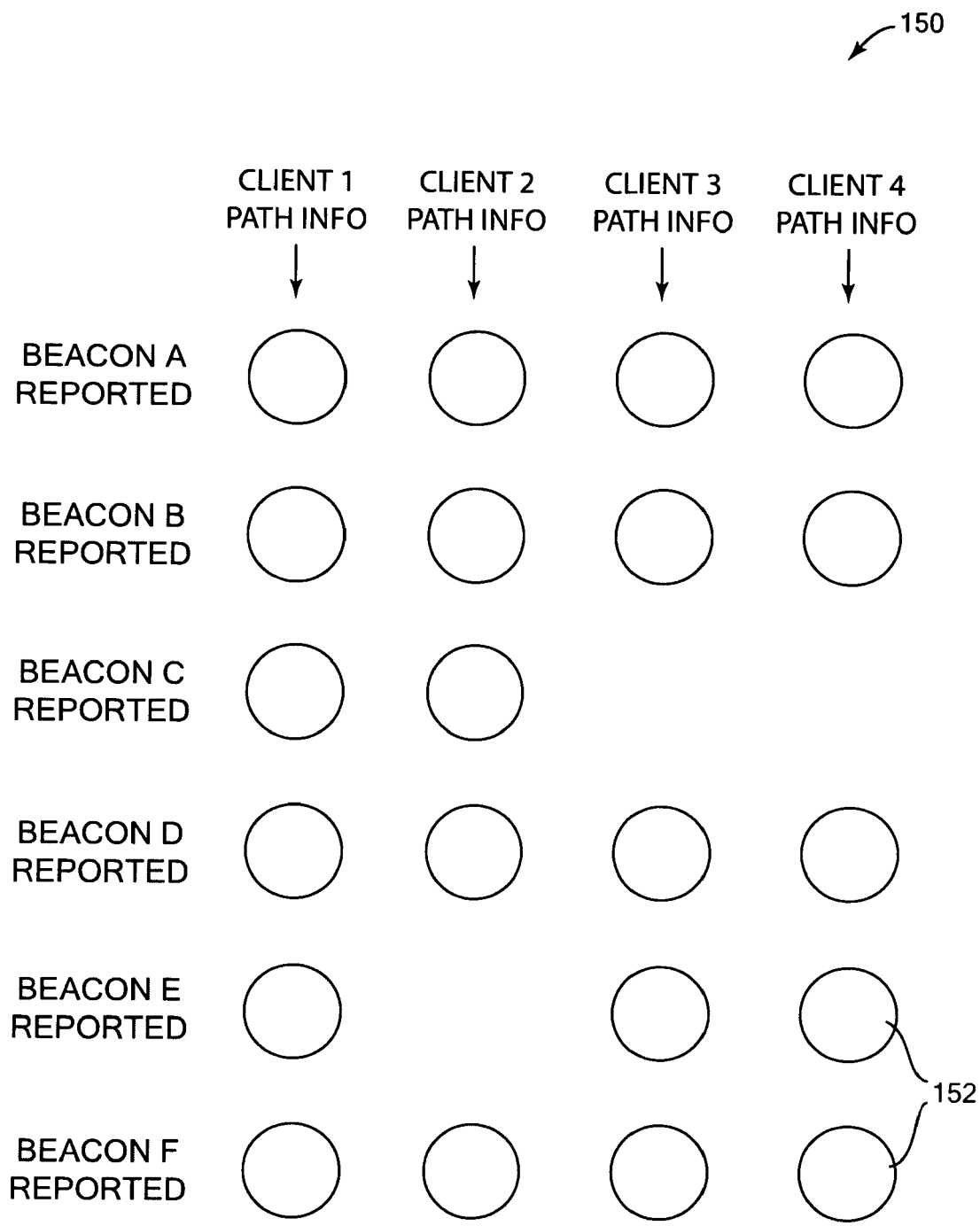
FIG. 3 is a diagrammatic illustration of beacon data received by the server and examined to determine failures in the beacons.

FIG. 3 is a diagrammatic illustration of an example of beacon data 150 received by the server 16 and examined to determine failures in the beacons 12. Beacon data 150 is stored in the raw location data repository 30 of the server 16 and includes path data from four different client devices 14, presented in the vertical axis in the order that the client devices 14 encountered the beacon signals. The data is presented along the horizontal axis in an order corresponding to the information acquisition time of the data, i.e. the order that the server 16 received the data, such that client device 1 detected each beacon 12 before client device 2 detected the same beacon, client device 2 detected each beacon before client device 3 detected the same beacon, and so on. In the example of data 150, for simplicity, each client device 1-4 has traveled the same path, such that each client device moved through the emitting range of Beacons A-F at the monitored area.

Each circle 152 indicates a beacon detection, e.g., a beacon identification code being reported by a client device 14 to the server 16. Along the path of client device 1, all the beacons in the path, Beacons A-F, were detected. Along the same path of client device 2, in which client device 2 was in detection range of each of Beacons A-F at a later point in time than was client device 1, Beacons A-D and F were detected, but Beacon E was not. Along the same path of client device 3, Beacons A, B, and D-F were detected, but Beacon C was not. Finally, along the same path of client device 4, Beacons A, B, and D-F were detected, but Beacon C was not.

A program, such as the location beacon error detection agent 32 of FIG. 1, can examine the accumulated beacon data and can make estimations about the operating state of the beacons 12 in the system. The agent compares client device beacon data on a particular path with predefined "normal" data for that path, where the normal data is stored in the path information and constraint repository 34 and shows what the beacon data should be if all beacons are operating properly on that path. Note that if the order of beacons detected by a client device is reversed from the order in the normal path, the agent 32 can still compare those pathways by simply reversing the order of one of the paths.

In addition, the agent 32 can compare the beacon data from the pathways of the different client devices 14 to make more accurate estimations of beacon functionality. By examining the data from each particular beacon at different times or over time, the agent gets a better picture as to how those beacons are behaving over time.

For example, assume the normal data for a particular beacon path is the same as the detected beacon data for client device 1 (in either order, from Beacons A to F or from Beacons F to A). By comparing the beacon data from the client 2 path to the normal data, the agent knows that Beacon E in the pathway of client device 2 is not functioning properly, since its signal was not detected where it should have been. In addition, the agent can compare each beacon data for client device 2 with that for client devices 3 and 4. The fact that Beacon E was not detected in the path of client device 2, but was later detected in the paths of client devices 3 and 4, indicates that Beacon E is providing spurious missing data that may indicate an impending permanent failure of Beacon E, but that Beacon E has not yet completely failed. Similarly, the agent can determine that Beacon C has failed in paths of client devices 3 and 4 by comparing that data to the normal path information. In addition, the fact that Beacon C was reported in the paths of client devices 1 and 3, but is no longer reported by client devices 3 or later, may indicate that Beacon C is no longer operational and may have permanently failed. Additional, later data can confirm this permanent failure from other client devices, if Beacon C is no longer detected at all.

The different client devices 14 may travel along different paths at the monitored area, and thus may detect Beacons A-F in a different order, or may have only some of the Beacons A-F in their path, and/or may detect other beacons in their paths in the area. In such cases, the agent can compare the normal pathway for each of these different paths, stored in repository 34, to the taken path. If comparing data from different client devices, where those client devices have all taken different paths in the area, the agent 32 can examine individual beacons, and can compare the times that each beacon was detected and each beacon ID sent, and thus determine the order of beacon detection (i.e., the horizontal direction in FIG. 3).

In some instances, a user or customer may reverse direction along a path. However, such reverses can be detected by the agent, since it knows the order beacons that should be detected along allowable paths in the area; if a client device reverses direction, then no further beacons are detected along a particular path, and the beacons already detected are detected again immediately. The agent can compare the part of the path taken that corresponds to the part of the normal path for that pathway.

Based on this examination, the agent 32 can output the beacon status report 36 that highlights these findings. This allows the system manager to quickly determine which beacons 12 have potential problems, and to test those beacons more thoroughly.

Figure 4:
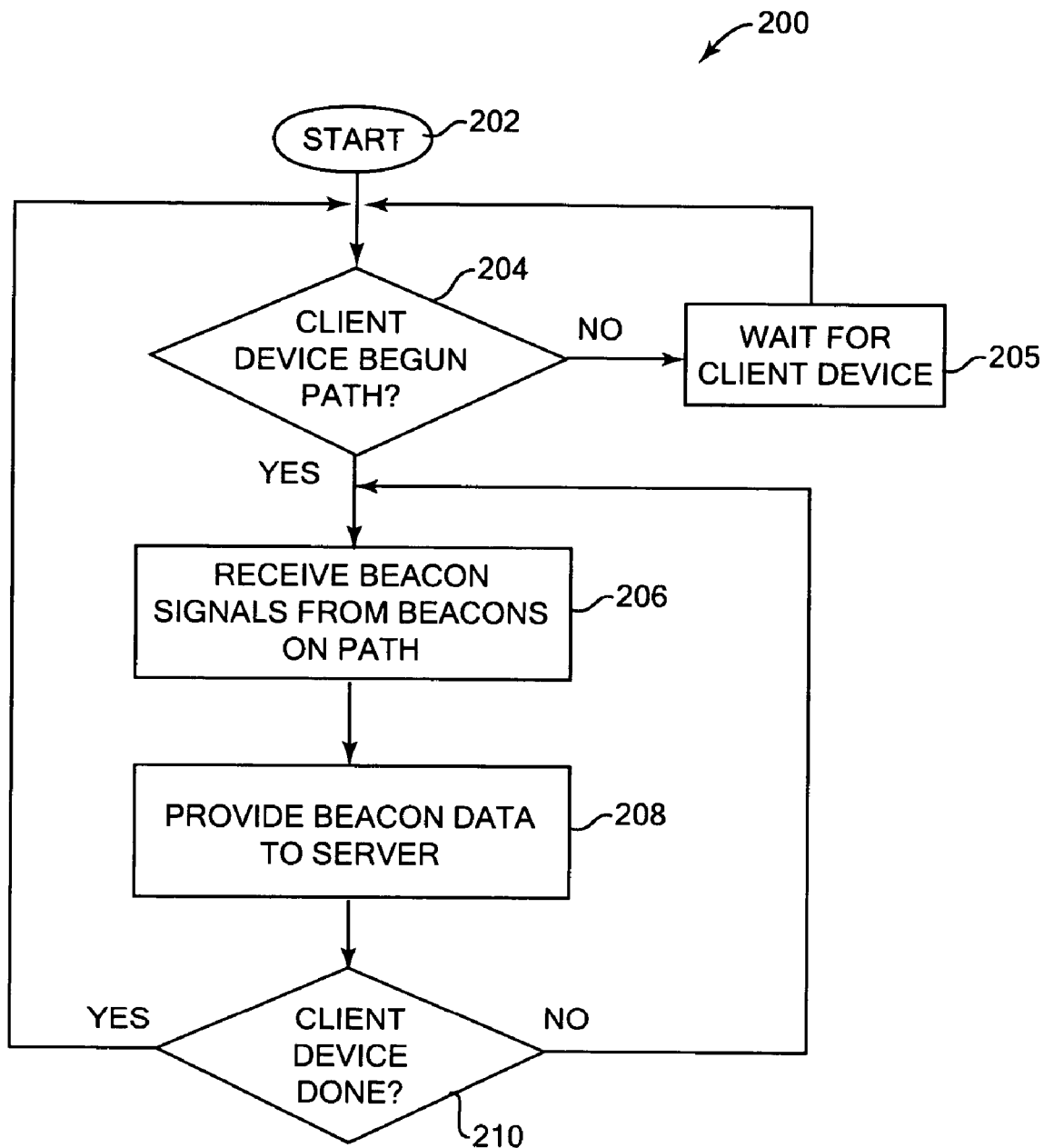
FIG. 4 is a flow diagram illustrating an example method of the present invention for detecting and storing beacon data for use in monitoring location based service infrastructure.

FIG. 4 is a flow diagram illustrating an example method 200 of the present invention for detecting and storing beacon data for use in monitoring location based service infrastructure. These steps can be implemented by the client device 14 and server 16 using program instructions stored on a computer readable medium, such as memory, hard drive, optical disk (CD-ROM, DVD-ROM, etc.), magnetic disk, etc. These steps can be implemented in hardware (logic gates, etc.), software, or a combination thereof.

The method begins at 202, and in step 204, the software on a client device 14 checks whether that client device 14 has begun moving on a path through the serviced area. For example, this path can start when the customer enters the area and the device detects a beacon signal. Or, the customer might activate a start control on a client device, indicating that the location based service is currently desired, e.g., shopping in a retail store area has begun. If no client device has begun detection, the method waits at step 205 and returns to step 204.

Once a client device 14 begins detecting a path through the area, step 206 is performed, in which a beacon signal is detected along the path. As described above, beacon signals can be IR signals received by an IR detector on the client device 14, or other types of signals. This beacon signal preferably includes unique identification data identifying that particular beacon. In some embodiments, additional information can be received from the beacons, such as battery or power life indicators, diode life indicators, or other emitter status indication data.

In step 208, the client device 14 provides beacon data, equivalent to the received beacon signal, to the server 16. As described above, this is preferably performed using a wireless signal from the client device 14 to the server 16, although any suitable communication channel can be used. In step 210, the client device 14 checks whether it is done, i.e., whether the customer has completed all desired movement within the monitored area and has exited or will exit the area. In some embodiments, this can be an automatic step, e.g., the client device 14 simply no longer detects any beacon signals. In other embodiments, the user may indicate that his or her activity within the area is ended, such as via an interface on the client device. If the client device is done, then the process returns to step 204 to check whether the client device has begun sensing beacon signals again. If the client device is not done, the process returns to step 206 where the client device 14 receives the beacon signal from the next beacon in its path.

It should be noted that method 200 is performed for each available client device 14, and that multiple instances of method 200 can be performed simultaneously, as various multiple client devices 14 are used in the monitored area at the same time, offset times, etc.

Figure 5:
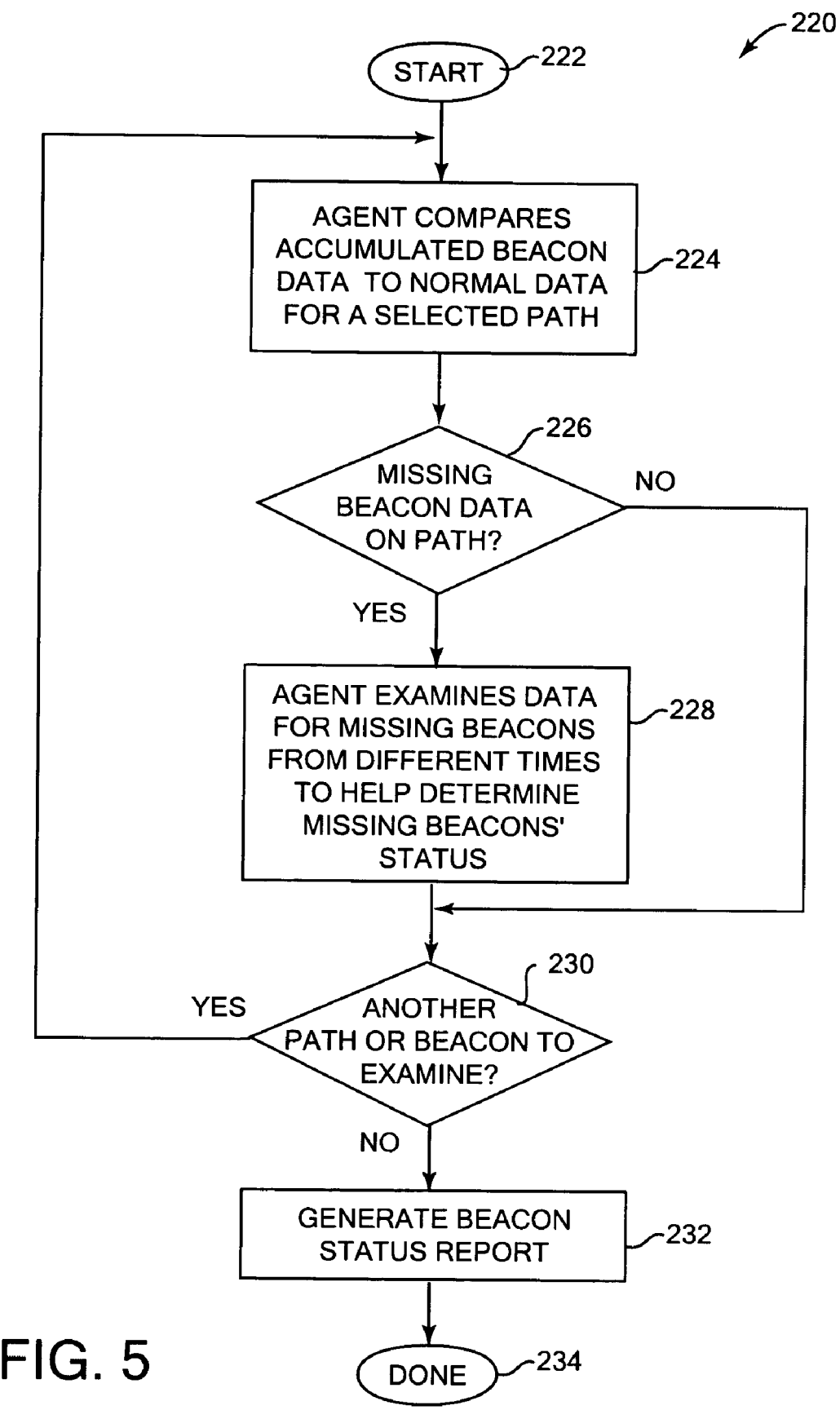
FIG. 5 is a flow diagram illustrating an example method of the present invention for examining beacon data to monitor location based service emitter infrastructure.

FIG. 5 is a flow diagram illustrating an example method 220 of the present invention for examining beacon data to monitor location based service emitter infrastructure. These steps can be implemented using program instructions stored on a computer readable medium, such as memory, hard drive, optical disk (CD-ROM, DVD-ROM, etc.), magnetic disk, etc. These steps can be implemented in hardware (logic gates, etc.), software, or a combination thereof.

The location beacon error detection agent 32 running on server 16 preferably implements these steps at predetermined or selected times. For example, the agent 32 can be set up to examine collected beacon data and provide a report at specified time intervals, such as once daily at a predetermined time, e.g., midnight. Preferably, the interval is set long enough to allow customers to take enough of the available paths in the store so that the client devices 14 move within the detection range of all (or most) of the beacons at the monitored area. In alternate embodiments, the steps of method 220 can be performed by software on the client devices 14 (with beacon data collected on client devices), or some steps performed by client devices 14 and others by the server 16.

The process begins at 222, and in step 224, the agent 32 examines collected beacon data in the raw location data repository 30 that has been collected since the last examination of the repository by agent 32. The agent compares the stored, accumulated detected beacon data to predefined normal beacon data for a selected path provided by a particular client device. For example, in one embodiment, the raw beacon data is organized into client device paths, and then those device paths are compared to the normal, expected paths. As described above, the normal (expected) beacon data is retrieved from the path information and constraint repository 34. In an alternate embodiment, the method can take each normal path and compare it to the raw beacon data.

In step 226, the agent determines whether there is any missing beacon data for the selected path. As explained with reference to FIG. 3, the missing beacon data can be determined with the comparison made in step 224 and applying rules and constraints known to the agent 32 from repository 34. If there is no missing beacon data on the path, then the process returns to step 224 to select another client device path (or another section of the same path) for analysis. If there is missing beacon data in the selected path, then in step 228 the agent examines the data for the missing beacon at different times to help determine the missing beacons' status. As described above, the missing beacon data indicates a possibly failing beacon, and the agent can determine if the problem is intermittent or permanent by examining the data from the same path detected at a different, later time by the same or other client devices 14.

Once the analysis is complete in step 228, the agent checks in step 230 whether another path or beacon in the raw location data repository 30 must still be examined for failure. If so, then the process returns to step 224 to select another path and examine its beacon data. If there is no more beacon data to analyze in step 230, then in step 232 the agent generates the beacon status report 36, which may be reviewed by an area manager or operator, another program, etc. The process is then completed at 234.

It should be noted than in alternate embodiments, the agent 32 can process the beacon data in other ways. For example, the beacon data can be examined in a different order or according to other criteria, e.g., according to individual beacons, the locations of the beacons, etc.

Although examples of the present invention has been described herein as pertinent to customers and retail shopping activity, the present invention is also applicable to other areas permitting other types of activities, in which a user and/or area operator can make use of a location based service including emitters or beacons.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for monitoring the infrastructure of a location based service, the method comprising:
    storing beacon data transmitted by a plurality of beacons in an area and detected by a client device that is moved along a path of locations in the area, the beacon data indicating detected locations on the path of the client device in the area; and
    analyzing the detected locations on the path of the client device as represented by the detected beacon data, the analyzing including comparing the detected locations to location data that represents the locations of the path in the area, the comparison indicating whether any beacons along the path of the client device have failed.

2. The method claim 1 wherein the beacon data is detected by the client device and provided to a server to be stored.

3. The method of claim 2 wherein the beacon data is provided from the client device to the server using wireless signals.

4. The method of claim 1 wherein analyzing the detected locations on the path includes determining whether any detectable beacons are failing intermittently, and whether any beacons have failed permanently.

5. The method of claim 1 wherein comparing the detected locations to location data includes comparing the detected beacon data on the path of the client device to a predefined normal set of beacon data corresponding to the path of the client device to determine whether any beacons along the path of the client device have failed.

6. The method of claim 1 wherein a plurality of client devices detect the beacon data from the beacons, each client device moving along a path in the area, and wherein analyzing the detected locations on the path includes analyzing detected locations on paths of the plurality of client devices to determine whether any beacons along the paths of the client devices have failed.

7. The method of claim 6 wherein comparing the detected locations to location data includes comparing the detected beacon data from a path of a client device to beacon data detected from the same path at a different time by the same client device or a different client device.

8. The method of claim 4 wherein determining whether any detectable beacons are failing intermittently includes comparing the detected beacon data to beacon data detected on the path at a plurality of later times.

9. The method of claim 6 wherein analyzing the detected locations on the paths is performed periodically, after a predetermined time period, when beacon data has been stored over the predetermined time period from the plurality of client devices.

10. The method of claim 1 wherein the beacon data includes a unique identification of the beacon transmitting the data.

11. The method of claim 1 wherein the failure of a beacon includes batteries providing insufficient power to the beacon.

12. The method of claim 1 wherein the area is a retail store, and wherein the client device is coupled to a shopping cart moved with a customer in the retail store.

13. A system for monitoring the infrastructure of a location based service, the system comprising:
    at least one client device that is moveable along at least one path of locations in an area and which can detect beacon data transmitted from each of a plurality of beacons provided in the area, the beacon data indicating detected locations on the path of the client device in the area; and a server that receives the beacon data from the at least one client device, the server including a storage device that stores the beacon data, wherein the server analyzes the detected locations on the path of the client device as represented by the detected beacon data, wherein the detected locations are compared to location data that represents the locations of the path in the area, the comparison indicating whether any beacons along the path of the client device have failed.

14. The system of claim 13 wherein the beacons use infrared signals to transmit the beacon data, and wherein the at least one client device includes an infrared detector that receives the infrared signals.

15. The system of claim 13 wherein the client device includes a wireless transmitter and the server includes a wireless receiver, such that the client device can send the beacon data to the server using wireless signals.

16. The system of claim 13 wherein the server analyzing the beacon data includes the server comparing the detected beacon data on the path of the client device to a predetermined normal set of beacon data corresponding to the path of the client device to determine whether any beacons along the path of the client device have failed.

17. The system of claim 13 wherein the at least one client device is a plurality of client devices, and wherein the plurality of client devices detect the beacon data from the beacons, each client device moving along at least one path in the area, and wherein the server analyzes the detected locations on the paths of the plurality of client devices to determine whether any beacons along the paths of the client devices have failed.

18. The system of claim 17 wherein the server analyzing the detected locations on the path includes the server comparing the detected beacon data from a path of a client device to data detected from the same path at a different time by the same client device or a different client device.

19. The system of claim 17 wherein the server analyzes the detected locations on the paths periodically, after a predetermined time period, when beacon data has been stored over the predetermined time period from the plurality of client devices.

20. The system of claim 13 wherein the beacon data includes a unique identification of the beacon transmitting the data.

21. The system of claim 13 wherein the area is a retail store, and wherein the client device is coupled to a shopping cart moved with a customer in the retail store.

22. A computer readable medium including program instructions to be implemented by a computer, the program instructions for monitoring the infrastructure of a location based service, the program instructions implementing steps comprising:

storing beacon data transmitted by a plurality of beacons in an area and detected by a client device that is moved along a path of locations in the area, the beacon data indicating detected locations on the path of the client device in the area; and analyzing the detected locations on the path of the client device as represented by the detected beacon data, the analyzing including comparing the detected locations to location data that represents the locations of the path in the area, the comparison indicating whether any beacons along the path of the client device have failed.

23. The computer readable medium of claim 22 wherein the beacon data was detected by the client device and provided to a server to be stored.

24. The computer readable medium of claim 23 wherein the beacon data is provided from the client device to the server using wireless signals.

25. The computer readable medium of claim 22 wherein analyzing the detected locations on the path includes determining whether any detectable beacons are failing intermittently, and whether any beacons have failed permanently.

26. The computer readable medium of claim 22 wherein comparing the detected locations includes comparing the detected beacon data on the path of the client device to a predetermined normal set of beacon data corresponding to the path of the client device to determine whether any beacons along the path of the client device have failed.

27. The computer readable medium of claim 22 wherein a plurality of client devices detect the beacon data from the beacons, each client device moving along a path in the area, and wherein analyzing the detected locations on the path includes analyzing detected locations on paths of the plurality of client devices to determine whether any beacons along the paths of the client devices have failed.

28. The computer readable medium of claim 27 wherein comparing the detected locations includes comparing the detected beacon data from a path of a client device to beacon data detected from the same path at a different time by the same client device or a different client device.

29. The computer readable medium of claim 25 wherein determining whether any detectable beacons are failing intermittently includes comparing the detected beacon data to beacon data detected on the path at a plurality of later times.

30. The computer readable medium of claim 27 wherein analyzing the detected locations on the paths is performed periodically, after a predetermined time period, when beacon data has been stored over the predetermined time period from the plurality of client devices.

31. The computer readable medium of claim 22 wherein the area is a retail store, and wherein the client device is coupled to a shopping cart moved with a customer in the retail store.

32. The method of claim 1 wherein a lack of detecting a beacon at one or more particular locations of the location data is used for indicating whether any beacons along the path of the client device have failed.

33. The system of claim 13 wherein a lack of detecting a beacon at one or more particular locations of the location data is used for indicating whether any beacons along the path of the client device have failed.

* * * * *